US012619130B2

(12) United States Patent     (10) Patent No.:   US 12,619,130 B2

Hwang et al.     (45) Date of Patent:     May 5, 2026

(54) CAMERA MODULE

(71) Applicant: LG INNOTEK CO., LTD., Seoul (KR)

(72) Inventors: Sun Min Hwang, Seoul (KR); Je Kyung Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 273 days.

(21) Appl. No.: 18/038,255

(22) PCT Filed: Dec. 9, 2021

(86) PCT No.: PCT/KR2021/018690
    § 371 (c)(1),
    (2) Date: May 23, 2023

(87) PCT Pub. No.: WO2022/124838
    PCT Pub. Date: Jun. 16, 2022

(65) Prior Publication Data
    US 2024/0004271 A1     Jan. 4, 2024

(30) Foreign Application Priority Data
    Dec. 10, 2020    (KR) ........................ 10-2020-0172217

(51) Int. Cl.
    *G03B 17/14*       (2021.01)
    *G03B 30/00*       (2021.01)

(52) U.S. Cl.
    CPC ............. *G03B 17/14* (2013.01); *G03B 30/00* (2021.01)

(58) Field of Classification Search
    CPC ................................ G03B 17/14; G03B 30/00

USPC ........................................................ 359/829
See application file for complete search history.

(56) References Cited

U.S. PATENT DOCUMENTS

| | | | |
|---|---|---|---|
| 10,054,757 | B2 | 8/2018 | Knutsson et al. |
| 2007/0146534 | A1 | 6/2007 | Kim et al. |
| 2017/0134638 | A1 | 5/2017 | Wang et al. |
| 2017/0230550 | A1 | 8/2017 | Leong et al. |
| 2018/0113274 | A1 | 4/2018 | Jung et al. |
| 2019/0137850 | A1 | 5/2019 | Ha et al. |
| 2020/0012068 | A1* | 1/2020 | Lim ...................... H05K 1/181 |

FOREIGN PATENT DOCUMENTS

| | | |
|---|---|---|
| CN | 109752902 A | 5/2019 |
| CN | 111007619 A | 4/2020 |
| JP | 2000-41167 A | 2/2000 |
| JP | 2002-14269 A | 1/2002 |
| JP | 2008-304641 A | 12/2008 |
| JP | 2016-534403 A | 11/2016 |

(Continued)

*Primary Examiner* — William Choi

(74) *Attorney, Agent, or Firm* — Birch, Stewart, Kolasch & Birch, LLP

(57) ABSTRACT

The camera module comprises: a housing; a lens holder disposed inside the housing; a lens module disposed inside the lens holder; and a printed circuit board disposed at a lower portion of the housing and including an image sensor facing the lens module, wherein the lens module is screw-coupled to an inner surface of the lens holder, wherein the lens holder is screw-coupled to an inner surface of the housing, and wherein the screw-coupled region of the lens module is disposed more adjacent to an upper end of the lens module than a lower end thereof.

17 Claims, 8 Drawing Sheets

(56)　　　　　　References Cited

FOREIGN PATENT DOCUMENTS

| KR | 10-0704910 | B1 | 4/2007 |
| KR | 10-2007-0068607 | A | 7/2007 |
| KR | 10-2010-0104054 | A | 9/2010 |
| KR | 10-1217597 | B1 | 1/2013 |
| KR | 10-2018-0044558 | A | 5/2018 |
| TW | 201316071 | A1 | 4/2013 |
| TW | 202029725 | A | 8/2020 |
| WO | WO 2017/220016 | A1 | 12/2017 |

* cited by examiner

CAMERA MODULE

Cross Reference to Related Applications

This application is the National Phase of PCT International Application No. PCT/KR2021/018690, filed on Dec. 9, 2021, which claims priority under 35 U.S.C. 119(a) to Patent Application No. 10-2020-0172217, filed in the Republic of Korea on Dec. 10, 2020, all of which are hereby expressly incorporated by reference into the present application.

TECHNICAL FIELD

This embodiment relates to a camera module.

BACKGROUND ART

Recently, ultra-small camera modules have been developed, and ultra-small camera modules are widely used in small electronic products such as smartphones, laptops, and game consoles.

With the popularization of automobiles, ultra-small cameras are widely used not only in small electronic products but also in vehicles. For example, a black box camera for vehicle protection or objective data of traffic accidents, a rear monitoring camera that allows the driver to monitor blind spots at the rear of the vehicle through the screen to ensure safety when the vehicle moves backward, a peripheral detection camera capable of monitoring the surroundings of the vehicle, and the like are provided.

The camera may include a lens, a lens holder accommodating the lens, an image sensor for converting an image of a subject collected in the lens into an electrical signal, and a printed circuit board on which the image sensor is mounted. The housing forming the outer shape of the camera has a structure in which the entire region thereof is sealed to prevent internal components from being contaminated from foreign substances including moisture.

Mechanical devices such as housings or lens holders may expand at a high temperature and contract at a low temperature according to a change in temperature. Such deformation of the mechanical devices has a problem in that it changes the distance between the image sensor and the lens.

DETAILED DESCRIPTION OF THE INVENTION

Technical Subject

An object of the present embodiment is improving the structure so as to provide a camera module capable of minimizing the change in a distance between an image sensor and a lens module due to a change in temperature.

Technical Solution

The camera module according to the present embodiment comprises: a housing; a lens holder disposed inside the housing; a lens module disposed inside the lens holder; and a printed circuit board disposed in a lower portion of the housing and including an image sensor facing the lens module, wherein the lens module is screw-coupled to an inner surface of the lens holder, wherein the lens holder is screw-coupled to an inner surface of the housing, and wherein the screw-coupled region of the lens module is disposed more adjacent to an upper end of the lens module than a lower end thereof.

The housing may include a body part in the shape of a cylinder and a protruded part being protruded downward from a lower surface of the body part, and a coupling member may be disposed between the protruded part and the printed circuit board.

The housing includes a first space section in which the lens holder is disposed and a second space section disposed at an inner side of the protruded part, and wherein a lower end of the lens module may be disposed in the second space section.

An inner surface of the housing to which the lens holder and the housing are screw-coupled may be the first space section.

The lens holder includes a third space section whose upper and lower surfaces are open and the lens module is coupled thereto, wherein a coupling part to which the lens module is screw-coupled is disposed on an inner surface of the third space section, and wherein the coupling part is disposed adjacent to an upper end of the lens holder.

A camera module according to another embodiment may comprise: a housing;

a lens holder disposed on an upper portion of the housing; a lens module disposed at an inner side of the housing and the lens holder; and a printed circuit board being disposed at a lower portion of the housing and including an image sensor facing the lens module, wherein the lens module is screw-coupled to an inner surface of the lens holder, and wherein the screw-coupled region of the lens module is disposed more adjacent to an upper end of the lens module than a lower end.

A second coupling member may be disposed between the housing and the lens holder, and the second coupling member may include an epoxy.

The housing includes a second protruded part protruded upward from an upper surface, wherein a third protruded part being protruded outward from other regions is disposed at a lower portion of the lens holder, and wherein the second coupling member may be disposed between the second protruded part and the third protruded part.

The housing includes a body part in the shape of a cylinder and a first protruded part being protruded downward from a lower surface of the body part, and a first coupling member may be disposed between the first protruded part and the printed circuit board.

The length of the screw-coupled region of the lens module and the lens holder with respect to the optical axis direction may be one half or less of the length of the lens module.

Advantageous Effects

In this embodiment, since the distance change between the image sensor and the lens module according to the temperature change is compensated through the coupling structure between the lens module and the lens holder, there is an advantage that the distance between the image sensor and the lens module can be kept constant and the resolution of the camera module can be stabilized.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention. In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

The 'optical axis direction' used hereinafter is defined as the optical axis direction of the lens module. Meanwhile, the 'optical axis direction' may correspond to an 'up and down direction', a 'z-axis direction', and the like.

The camera module according to an embodiment of the present invention may be a vehicle camera module, but is not limited thereto.

Hereinafter, the present invention will be described in more detail with reference to the accompanying drawings.

Figure 1:
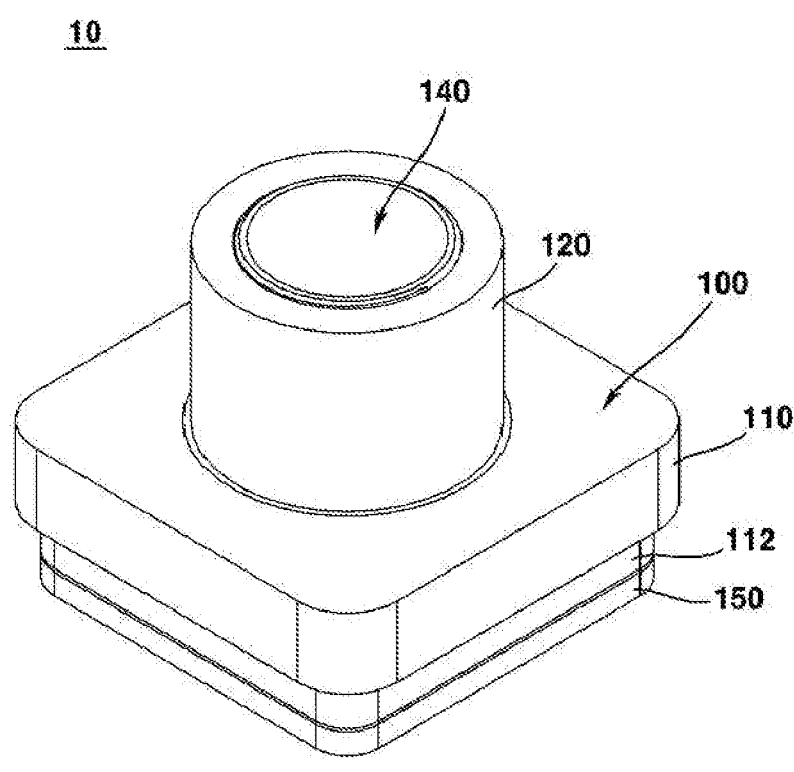
FIG. 1 is a perspective view of a camera module according to a first embodiment of the present invention.
Figure 2:
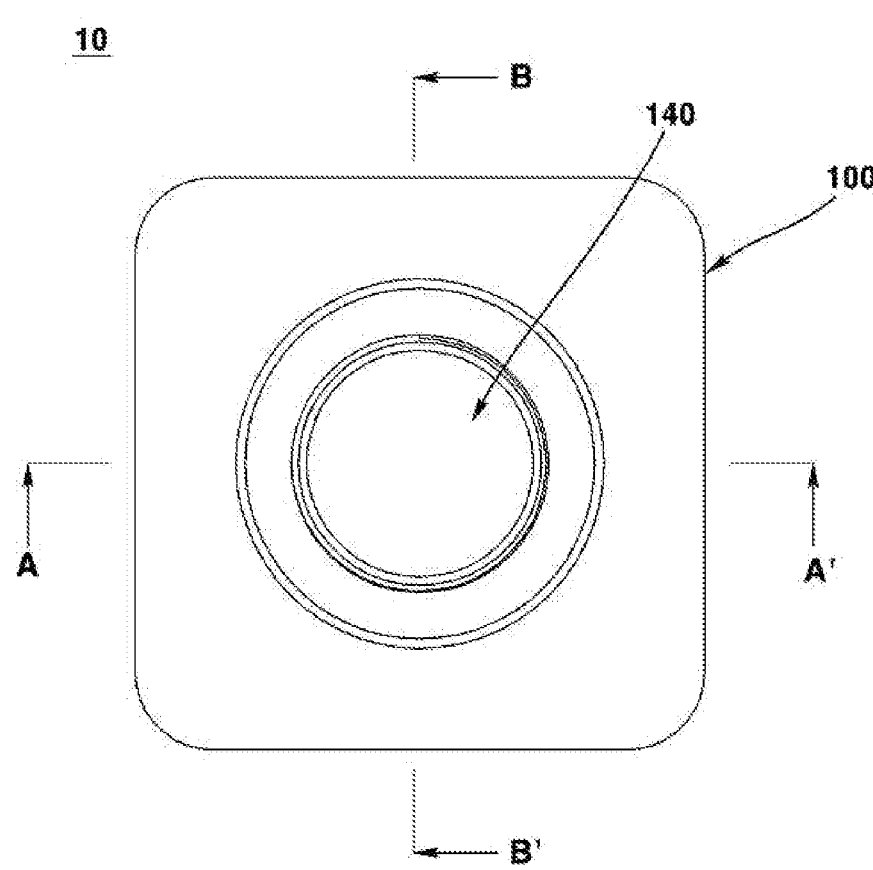
FIG. 2 is a plan view illustrating an upper surface of a camera module according to a first embodiment of the present invention.
Figure 3:
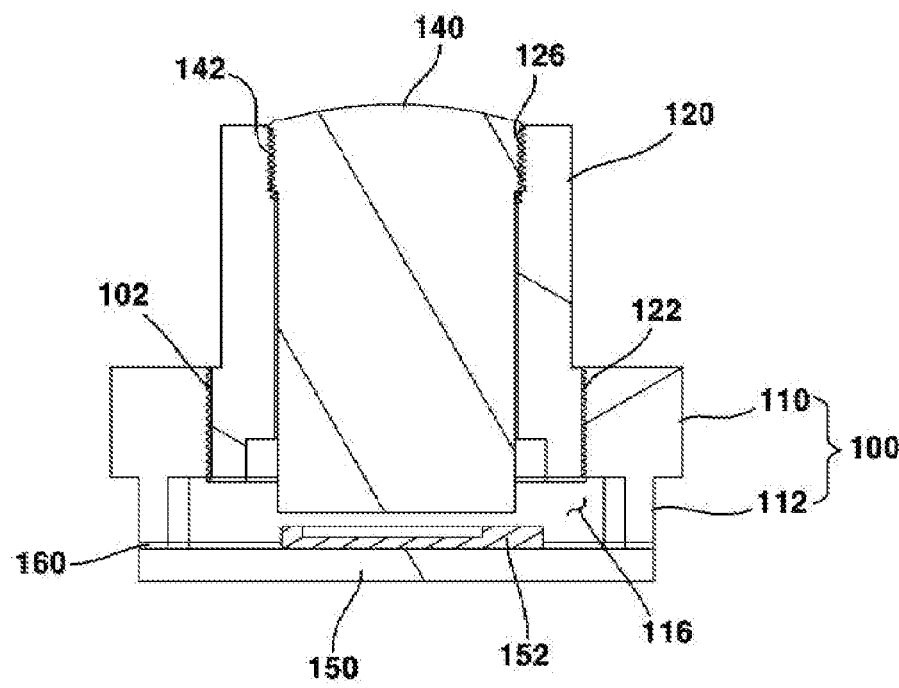
FIG. 3 is a cross-sectional view taken along line A-A' of FIG. 2.
Figure 4:
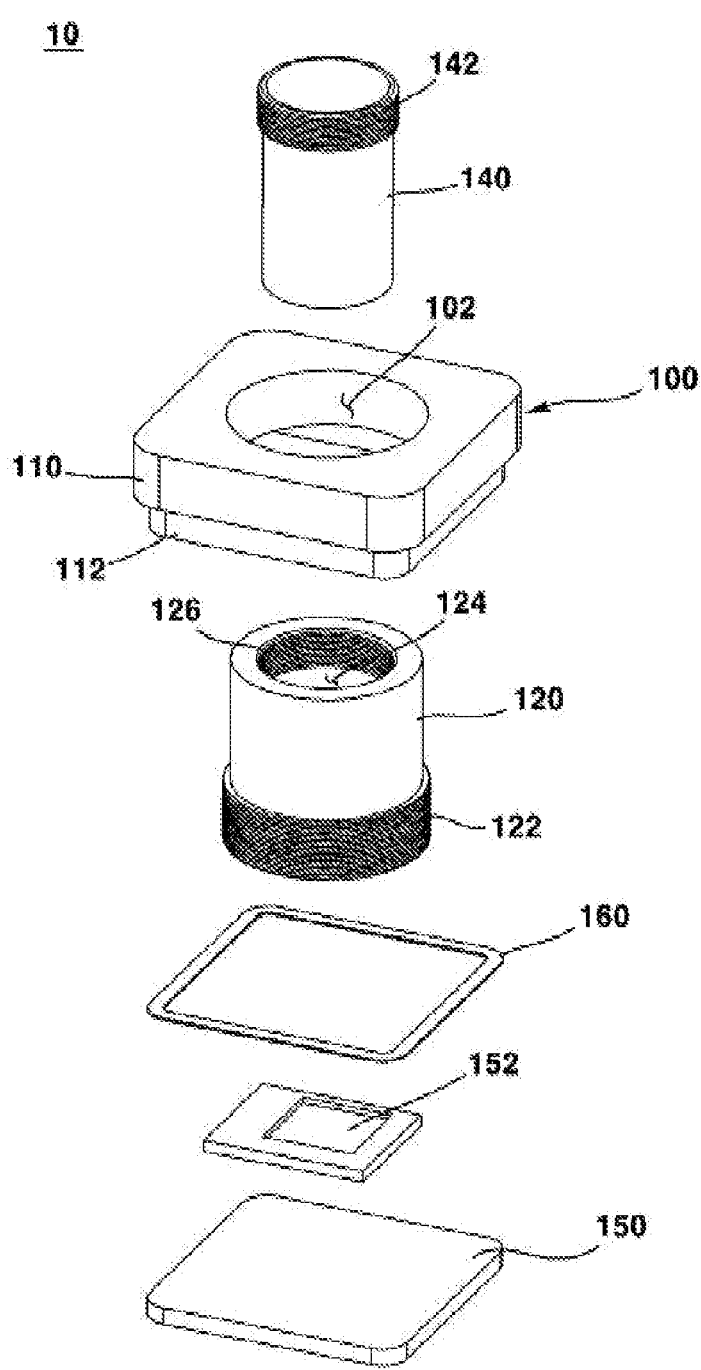
FIG. 4 is an exploded perspective view of a camera module according to a first embodiment of the present invention.

FIG. 1 is a perspective view of a camera module according to a first embodiment of the present invention, FIG. 2 is a plan view showing an upper surface of a camera module according to a first embodiment of the present invention, FIG. 3 is a cross-sectional view taken along line A-A' of FIG. 2, and FIG. 4 is an exploded perspective view of a camera module according to a first embodiment of the present invention.

Referring to FIGS. 1 to 4, the camera module 10 according to a present embodiment may comprise a housing 100, a lens holder 120, a lens module 140, and a printed circuit board 150, but it may be implemented except for some of the configurations, and does not exclude additional configurations.

The housing 100 may form an external shape of the camera module 10. The housing 100 may accommodate the lens holder 120 and the lens module 140. A space for accommodating the lens holder 120 and the lens module 140 may be formed at an inner side of the housing 100. The housing 100 may have a shape in which upper and lower surfaces are open. The cross-sectional shape of the housing 100 may be formed in the shape of a rectangle.

The housing 100 and the lens holder 120 may be formed of a plastic material.

The housing 100 may include a body part 110 and a protruded part 112 protruded downward from a lower surface of the body part 110. The outer surface of the body part 110 may be disposed to be protruded further outward than the outer surface of the protruded part 112. A cross-sectional area of the protruded part 112 may be smaller than a cross-sectional area of the body part 110. The lower surface of the protruded part 112 may be disposed to face the upper surface of the printed circuit board 150. A side surface of the protruded part 112 may form the same plane as a side surface of the printed circuit board 150. A cross-sectional area of the protruded part 112 being defined in a direction perpendicular to the optical axis direction of the camera module 10 may correspond to a cross-sectional area of the printed circuit board 150.

A first space section 102 may be formed at an inner side of the body part 110. A second space section 116 may be formed at an inner side of the protruded part 112. The first space section 102 and the second space section 116 may be disposed in an up and down direction. The first space section 102 and the second space section 116 may communicate with each other. A cross-sectional area of the second space section 116 may be larger than a cross-sectional area of the first space section 102. A screw thread or a screw groove may be formed on an inner circumferential surface of the first space section 102. Accordingly, the lens holder 120 may be screw-coupled inside the first space section 102.

The lens holder 120 may be disposed inside the housing 100. The lens holder 120 may be coupled to the housing 100. The lens holder 120 may accommodate at least a portion of the lens module 140. The lens holder 120 may be referred to as a lens barrel in that it accommodates the lens module 140. A cross-section of the lens holder 120 may be in the shape of a circle.

At least a portion of the lens holder 120 is disposed inside the housing 100, and another part may be disposed to be protruded upward from the housing 100. At least a portion of the lens holder 120 may be disposed at an inner side of the body part 110.

The lens holder 120 may include a first coupling part 122. The first coupling part 122 may be disposed at a lower portion of the lens holder 120. The first coupling part 122 may be disposed at an inner side of the body part 110. The first coupling part 122 may be formed when a portion of the side surface of the lens holder 120 is being protruded outward. The first coupling part 122 may be disposed further protruded outward than the other region of the side surface of the lens holder 120. A cross-sectional area of the first coupling part 122 may be larger than a cross-sectional area of the other side surface of the lens holder 120. The first coupling part 122 may be disposed to face the body part 110 in a direction perpendicular to the optical axis direction. The first coupling part 122 may be disposed inside the first space section 102. A screw groove or a screw thread may be formed on an outer circumferential surface of the first coupling part 122. Accordingly, the lens holder 120 may be screw-coupled to the housing 100.

The lens holder 120 may be formed in which upper and lower surfaces are open. A third space section 124 may be disposed at an inner side of the lens holder 120. The third space section 124 may have a hole shape penetrating through the lower surface from the upper surface of the lens holder 120. The cross-sectional shape of the lens holder 120 may be formed in the shape of a ring.

A second coupling part 126 may be disposed on an inner circumferential surface of the third space section 124. The second coupling part 126 may be disposed more adjacent to the upper end of the lens holder 120 than the lower end. The second coupling part 126 may be disposed to be extended a predetermined distance downward from the upper end of the lens holder 120 in the optical axis direction. The second coupling part 126 may be disposed to face at least a portion of the lens module 140 in a direction perpendicular to the optical axis direction. The second coupling portion 126 may be a screw thread or a screw groove formed on the inner surface of the third space section 124. The lens holder 120 may be screw-coupled to the lens module 140 through the second coupling part 126. The second coupling part 126 may be disposed more adjacent to the upper end of the lens holder 120 than the lower end.

The camera module 10 may include a lens module 140. The lens module 140 may be disposed inside the lens holder 120. An upper end of the lens module 140 may form an upper surface of the camera module 10. The outermost lens among the lenses constituting the lens module 140 may be disposed to be protruded upward from the lens holder 120. The upper end of the lens module 140 may be protruded upward from the camera module 10 than other regions. A lower end of the lens module 140 may be protruded lower than a lower end of the lens holder 120, so that at least a portion of the lens module 140 may be disposed inside the second space section 116.

The lens module 140 may include a plurality of lenses. The lens module 140 may be disposed to face the image sensor 152 of the printed circuit board 150, which will be described later, in the optical axis direction. The lens module 140 may be aligned with the image sensor 152. The optical axis of the lens module 140 may coincide with the optical axis of the image sensor 152. An infrared filter (IR filter, not shown) may be disposed between the lens module 140 and the image sensor 152.

A third coupling part 142 may be disposed in a region of the outer surface of the lens module 140 facing the second coupling part 126. The third coupling part 142 may have a shape in which a portion of the side surface of the lens module 140 is protruded outwardly perpendicular to the optical axis direction. The third coupling part 142 may be disposed more adjacent to the upper end of the lens module 140 than the lower end. The third coupling part 142 may be disposed to face the second coupling part 126. A screw thread or a screw groove may be formed on the outer surface of the third coupling part 142. Accordingly, the lens holder 120 and the lens module 140 may be screw-coupled through the second coupling part 126 and the third coupling part 142. In summary, the upper end of the lens module 140 may be screw-coupled to an inner side of the lens holder 120.

Meanwhile, with respect to the optical axis direction, the length of the screw coupling region between the lens holder 120 and the lens module 140 may be formed to be one half or less of the length of the lens module 140.

The printed circuit board 150 may be disposed at a lower portion of the housing 100. The printed circuit board 150 may be formed in the shape of a plate, and at least one electronic component for driving the camera module 10 may be disposed on an outer surface of the printed circuit board 150. For example, an image sensor 152 may be disposed on an upper surface of the printed circuit board 150. The image sensor 152 may be disposed to face the lens module 140 in the optical axis direction. The image sensor 152 may convert the image of the subject incident through the lens module 140 into an electrical signal. The image sensor 152 may be disposed inside the second space section 116.

The printed circuit board 150 may be coupled to the housing 100. A lower end of the protruded part 112 may be coupled to an upper surface of the printed circuit board 150. A coupling member 160 may be disposed between the protruded part 112 and the printed circuit board 150. The coupling member 160 may include epoxy or rubber. For example, the coupling member 160 may be an epoxy applied between the housing 100 and the printed circuit board 150.

The coupling member 160 may not only couple the protruded part 112 and the printed circuit board 150 to each other, but also prevent foreign substances from being introduced into the second space section 116. The coupling member 160 may be formed in the shape of a ring. A cross-sectional shape of the coupling member 160 may correspond to a cross-sectional shape of the protruded part 112. FIG. 3 illustrates that the coupling member 160 is widely disposed on the upper surface of the printed circuit board 150 except for the region where the image sensor 152 is disposed, but is not limited thereto, and the coupling member 160 may be disposed only on the printed circuit board 150 facing the lower end of the protruded part 112.

The distance between the lens module 140 and the image sensor 152 may be adjusted through the coupling member 160. The distance between the lens module 140 and the image sensor 152 in the optical axis direction may be achieved by adjusting the thickness of each region of the coupling member 160.

Meanwhile, at a high temperature, the housing 110 or the coupling member 160 may be expanded due to the material characteristics of the housing 100 or the coupling member 160. Accordingly, the distance between the image sensor 152 and the lens module 140 may be increased. However, in this embodiment, the upper end of the lens module 140 may be fixed by the screw-coupling structure between the lens module 140 and the lens holder 120, and the lower end of the lens module 140 may be expanded to be protruded downward through the high temperature. Accordingly, the distance between the lens module 240 and the image sensor 252 may be decreased again through the expansion of the lens module 240 as much as the distance between the lens module 240 and the image sensor 252 that has been separated by the expansion of the housing 100 or the coupling member 160.

In addition, at a low temperature, the housing 100 or the coupling member 160 may be contracted. Accordingly, the distance between the image sensor 152 and the lens module 140 may be decreased. However, in this embodiment, since the lower end is moved upward by the contraction of the lens module 140 while the upper end of the lens module 140 is fixed by the screw-coupling structure between the lens module 140 and the lens holder 120, the distance between the lens module 140 and the image sensor 152 may be increased again as much as the distance between the lens module 140 and the image sensor 152 that that has been decreased by the contraction of the housing 100 or the coupling member 160 by the contraction of the lens module 140.

In summary, since the changed distance between the lens module 140 and the image sensor 152 is compensated through contraction and expansion of the lens module 140 by expansion and contraction of the housing 100, the lens holder 120, and the coupling member 160 at high or low temperatures, it is possible to minimize the change in the distance between the image sensor 152 and the lens module 140 due to temperature change, and the resolution of the camera module 10 may be stabilized.

Figure 5:
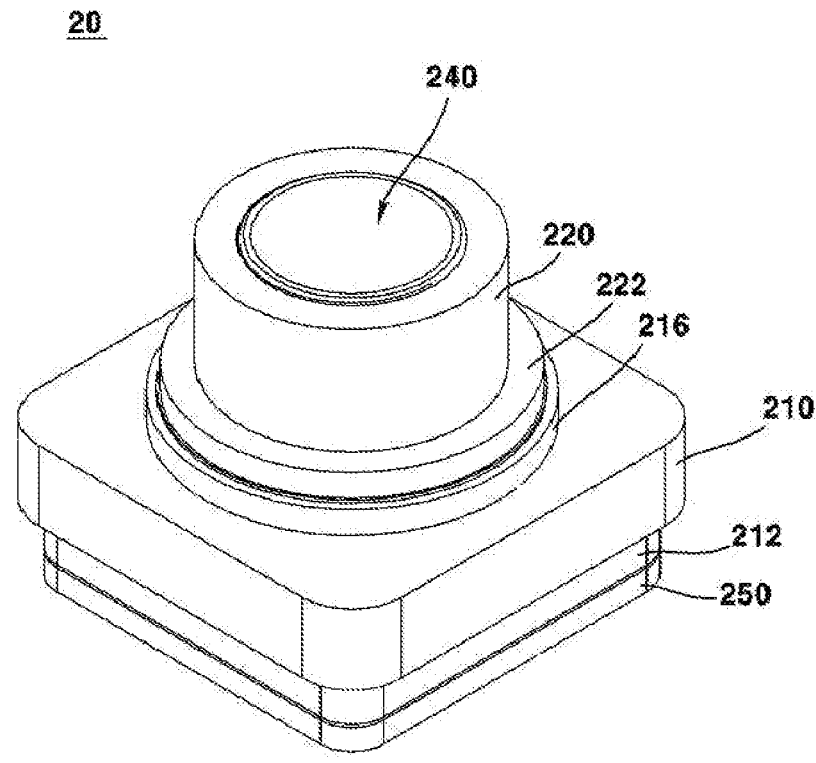
FIG. 5 is a perspective view of a camera module according to a second embodiment of the present invention.
Figure 6:
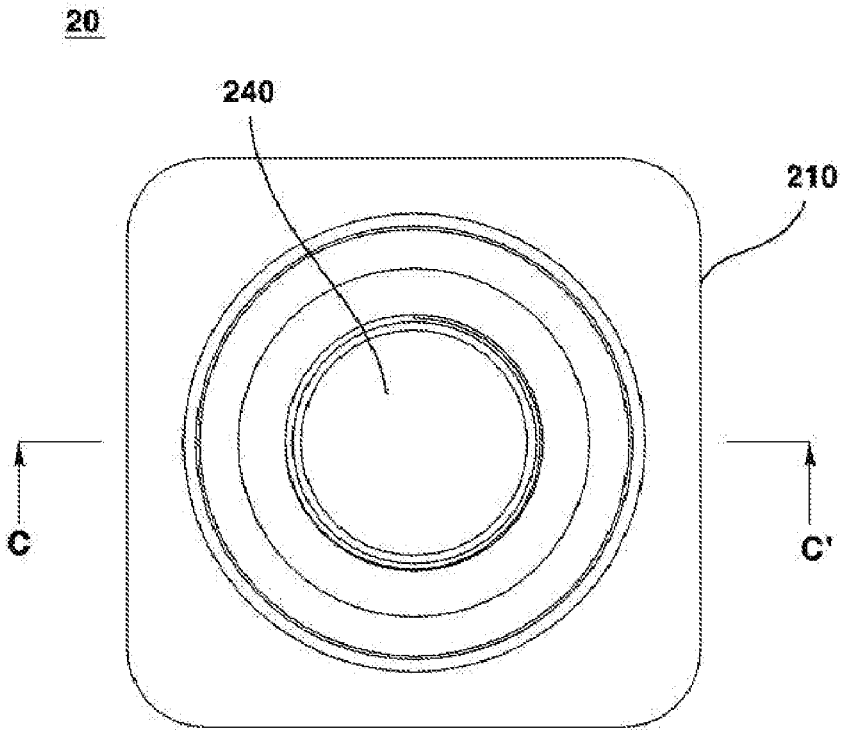
FIG. 6 is a plan view illustrating an upper surface of a camera module according to a second embodiment of the present invention.
Figure 7:
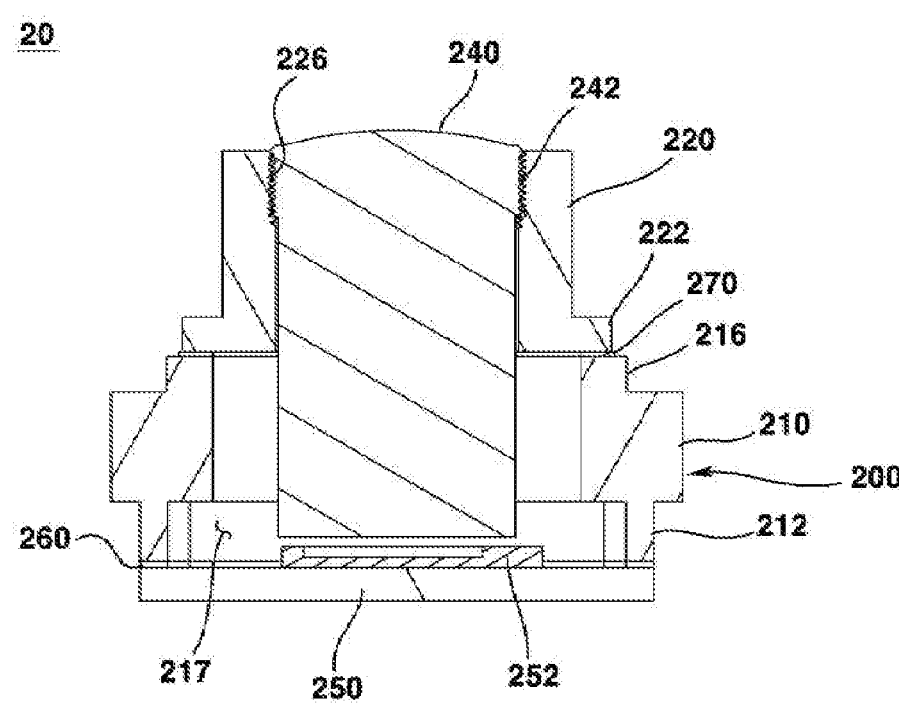
FIG. 7 is a cross-sectional view taken along line C-C' of FIG. 6.
Figure 8:
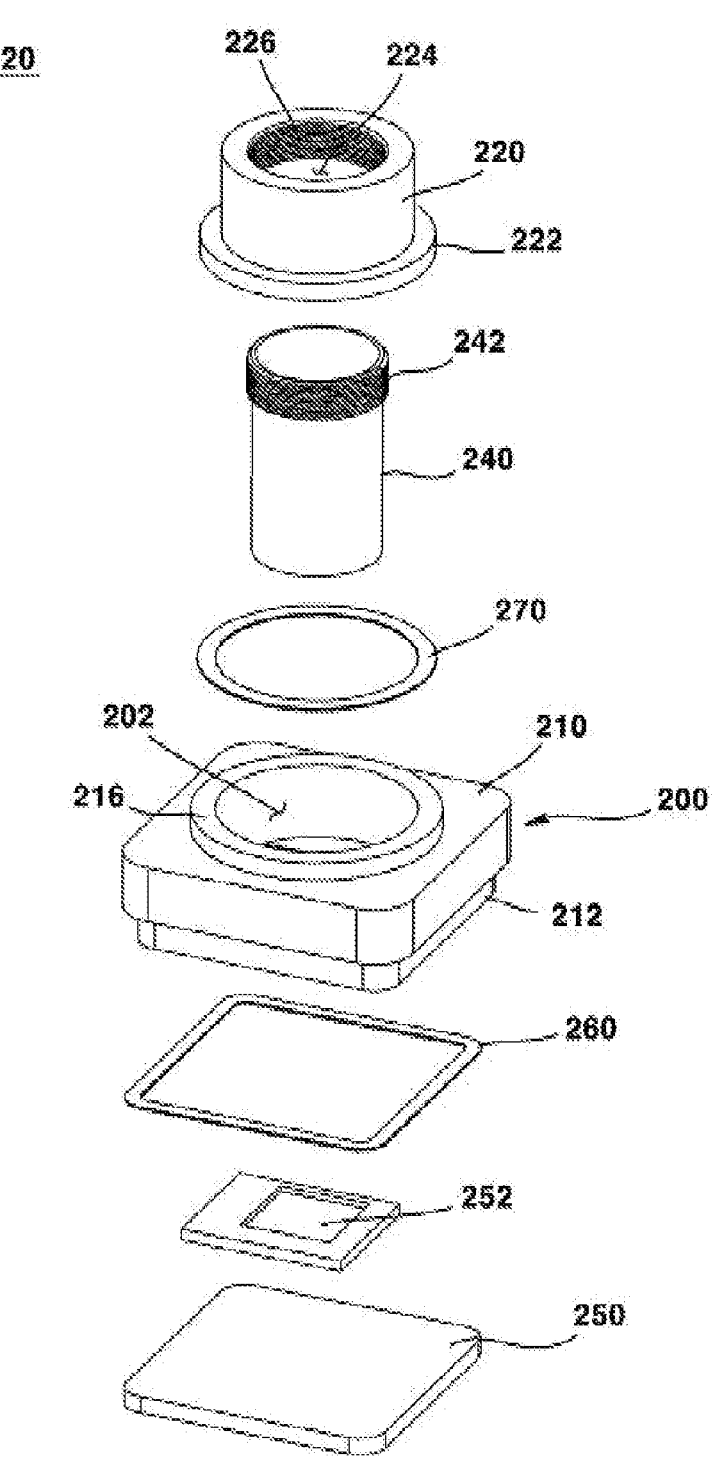
FIG. 8 is an exploded perspective view of a camera module according to a second embodiment of the present invention.

FIG. 5 is a perspective view of a camera module according to a second embodiment of the present invention, FIG. 6 is a plan view illustrating an upper surface of a camera module according to a second embodiment of the present invention, FIG. 7 is a cross-sectional view taken along line C-C' of FIG. 6, and FIG. 8 is an exploded perspective view of a camera module according to a second embodiment of the present invention.

In the present embodiment, other parts are the same as those in the first embodiment, except that there is a difference in the case structure of the camera module. Therefore, hereinafter, only the characteristic parts of the present embodiment will be described, and for the remaining parts, the description of the first embodiment will be referred to.

Referring to FIGS. 5 to 8, the camera module 20 according to the present embodiment may include a housing 200, a lens holder 220, a lens module 240, and a printed circuit board 250, but it may be implemented except for some of the configurations, and does not exclude additional configurations.

The housing 200 may form the external shape of the camera module 20. The housing 200 may accommodate the lens module 240. A space for accommodating the lens module 240 may be formed at an inner side of the housing 200. The housing 200 may have a shape in which upper and lower surfaces are open. The cross-sectional shape of the housing 200 may be formed in the shape of a rectangle.

The housing 200 and the lens holder 220 may be formed of a plastic material.

The housing 200 may include a body part 210, a first protruded part 212 protruded downward from a lower surface of the body part 210, and the second protruded part 216 protruded upward from an upper surface of the body part 210. The outer surface of the body part 210 may be disposed to be more protruded outward than the outer surfaces of the first protruded part 212 and the second protruded part 216. A cross-sectional area of the first protruded part 212 or the second protruded part 216 may be smaller than a cross-sectional area of the body part 210.

A lower surface of the first protruded part 212 may be disposed to face an upper surface of the printed circuit board 250. A side surface of the first protruded part 212 may form the same plane as a side surface of the printed circuit board 250. A cross-sectional area of the first protruded part 212 defined in a direction perpendicular to the optical axis direction of the camera module 20 may correspond to a cross-sectional area of the printed circuit board 250.

The second protruded part 216 may be formed in a way that a portion of the upper surface of the body part 210 is protruded upward. The second protruded part 216 may have a cross-section in the shape of a ring. An upper surface of the second protruded part 216 may be disposed to face a lower surface of the lens holder 220 in the optical axis direction. An upper surface of the second protruded part 216 may be coupled to a lower surface of the lens holder 220 through a second coupling member 270, which will be described later.

A first space section 202 may be formed at an inner side of the body part 210 and the second protruded part 216. A second space section 217 may be formed at an inner side of the first protruded part 212. The first space section 202 and the second space section 217 may be disposed in an up and down direction. The first space section 202 and the second space section 217 may communicate with each other. A cross-sectional area of the second space section 217 may be formed to be larger than a cross-sectional area of the first space section 202.

The lens holder 220 may be disposed at an upper portion of the housing 200. The lens holder 220 may be coupled to an upper surface of the housing 200. The lens holder 220 may accommodate at least a portion of the lens module 240. The lens holder 220 may be referred to as a lens barrel in that it accommodates the lens module 240. A cross-section of the lens holder 220 may be circular.

The lens holder 220 may be a shape in which the upper and lower surfaces thereof are open. A third space section 224 accommodating at least a portion of the lens module 240 may be disposed at an inner side of the lens holder 220. The third space section 224 may have a shape of a hole penetrating through the lower surface from the upper surface of the lens holder 220.

A first coupling part 226 may be disposed on an inner circumferential surface of the third space section 224. The first coupling part 226 may be disposed closer to an upper end of the lens holder 220 than a lower end thereof. The first coupling part 226 may be disposed to be extended a predetermined distance downward in the optical axis direction from an upper end of the lens holder 220. The first coupling part 226 may include a screw thread or a screw groove formed on an inner surface of the third space section 224. The lens module 240 may be screw-coupled to an inner side of the lens holder 220 through the first coupling part 226.

Meanwhile, the length of the screw-coupling region between the lens holder 220 and the lens module 240 with respect to the optical axis direction may be formed to be one half or less than the length of the lens module 240.

A third protruded part 222 for coupling with the housing 200 may be disposed at a lower portion of the lens holder 220. The third protruded part 222 may have a shape in which a part of a side surface of the lens holder 220 is protruded outward. The third protruded part 222 may form a lower end of the lens holder 220. An outer side surface of the third protruded part 222 may be disposed at an outer side of an outer side surface formed in another region of the lens holder 220. A portion of the lower surface of the third protruded part 222 may be disposed to face the upper surface of the second protruded part 216 in the optical axis direction. An outer surface of the third protruded part 222 may be disposed at an inner side than an outer surface of the second protruded part 216, but is not limited thereto, and an outer surface of the third protruded part 222 and an outer surface of the second protruded part 216 may form the same plane.

A second coupling member 270 may be disposed between an upper surface of the second protruded part 216 and a lower surface of the third protruded part 222.

The camera module 20 may include a lens module 240. At least a portion of the lens module 240 may be disposed at an inner side of the lens holder 220. An upper end of the lens module 240 may form an upper surface of the camera module 20. The upper end of the lens module 240 may be protruded upward of the camera module 20 than other regions. The lower end of the lens module 240 may be protruded further downward than a lower end of the lens holder 220 and a lower surface of the body part 210, so that at least a portion of the lens module 240 may be disposed inside the second space section 217.

The lens module 240 may include a plurality of lenses. The lens module 240 may be disposed to face the image sensor 252 of the printed circuit board 250, which will be described later, in the optical axis direction. The lens module 240 may be aligned with the image sensor 252. The optical axis of the lens module 240 may coincide with the optical axis of the image sensor 252. An infrared filter (infrared ray filter, not shown) may be disposed between the lens module 240 and the image sensor 252.

A second coupling part 242 may be disposed in a region of an outer surface of the lens module 240 facing the first coupling part 226. The second coupling part 242 may have a shape in which a part of a side surface of the lens module 240 is protruded outwardly perpendicular to the optical axis direction. The second coupling part 242 may be disposed more adjacent to the upper end of the lens module 240 than the lower end. The second coupling part 242 may be disposed to face the first coupling part 226 in a direction perpendicular to the optical axis direction. A screw thread or a screw groove may be formed on an outer surface of the second coupling part 242. Accordingly, the lens holder 220 and the lens module 240 may be screw-coupled through the first coupling part 226 and the second coupling part 242. In summary, the upper end of the lens module 240 may be screw-coupled to the lens holder 220.

The printed circuit board 250 may be disposed in a lower portion of the housing 200. The printed circuit board 250 may be formed in the shape of a plate, and at least one electronic component for driving the camera module 20 may be disposed on an outer surface of the printed circuit board 250. For example, an image sensor 252 may be disposed on an upper surface of the printed circuit board 250. The image sensor 252 may be disposed to face the lens module 240 in the optical axis direction. The image sensor 252 may convert an image of a subject incident through the lens module 240 into an electrical signal. The image sensor 252 may be disposed in the second space section 217.

The printed circuit board 250 may be coupled to the housing 200. A lower end of the first protruded part 212 may be coupled to an upper surface of the printed circuit board 250. A first coupling member 260 may be disposed between the protruded part 212 and the printed circuit board 250. The first coupling member 260 may include epoxy or rubber. For example, the first coupling member 260 may be an epoxy applied between the housing 200 and the printed circuit board 250.

The first coupling member 260 may not only couple the first protruded part 212 and the printed circuit board 250 to each other, but also prevent foreign substances from being introduced into the second space section 217. The cross-section of the first coupling member 260 may be formed in the shape of a ring. A cross-sectional shape of the first coupling member 260 may correspond to a cross-sectional shape of the first protruded part 212. In FIG. 7, although it is exemplified that the first coupling member 260 is widely disposed on an upper surface of the printed circuit board 250 except for the region where the image sensor 252 is disposed, but it is not limited thereto and the first coupling member 260 may be disposed only on the printed circuit board 250 facing the lower end of the first protruded part 212.

The distance between the lens module 240 and the image sensor 252 may be adjusted through the first coupling member 260. The distance between the lens module 240 and the image sensor 252 in the optical axis direction may be achieved by adjusting the thickness of each region of the first coupling member 260.

The second coupling member 270 may be disposed between the lens holder 220 and the housing 200. The second coupling member 270 may be disposed between an upper surface of the second protruded part 216 and a lower surface of the third protruded part 222. The second coupling member 270 may include epoxy or rubber. For example, the second coupling member 260 may be an epoxy applied between the upper surface of the second protruded part 216 and the lower surface of the third protruded part 222.

The second coupling member 270 may not only couple the lens holder 220 and the housing 200 to each other, but also prevent foreign substances from being introduced into the housing 200. The cross-section second coupling member 270 may be formed in the shape of a ring shape.

The distance between the lens module 240 and the image sensor 252 may be adjusted through the second coupling member 270. The distance between the lens module 240 and the image sensor 252 in the optical axis direction may be achieved by adjusting the thickness of each region of the second coupling member 270.

Meanwhile, in the present embodiment, a plurality of coupling members including the first coupling member 260 and the second coupling member 270 are disposed in the camera module 20 as an example, but the camera module 20 may include only one of them and exclude the other.

Meanwhile, at a high temperature, the housing 200, the lens holder 220, and the coupling members 260 and 270 may be expanded due to material characteristics of the housing 200, the lens holder 220, and the coupling members 260 and 270. Accordingly, the distance between the image sensor 252 and the lens module 240 may be increased. However, in the present embodiment, the upper end of the lens module 240 may be fixed by the screw-coupling structure between the lens module 240 and the lens holder 220, and the lower end of the lens module 240 may be expanded to be protruded downward through the high temperature. Accordingly, the distance between the lens module 240 and the image sensor 252 may become close again through the expansion of the lens module 240 as much as the distance between the lens module 240 and the image sensor 252 that has been separated by the expansion of the lens holder 220 and the coupling members 260 and 270.

In addition, at a low temperature, the housing 200, the lens holder 220, and the coupling members 260 and 270 may be contracted. However, in the present embodiment, the distance between the image sensor 252 and the lens module 240 may be decreased. However, in the present embodiment, since the upper end of the lens module 240 may be fixed by the screw-coupling structure between the lens module 240 and the lens holder 220, and the lower end of the lens module 240 is moved upward due to the contraction of the lens module 240, the distance between the lens module 240 and the image sensor 252 may be increased again as much as the distance between the lens module 240 and the image sensor 252 that has been decreased through the contraction of the housing 200, the lens holder 220, and the coupling members 260 and 270.

In summary, since the changed distance between the lens module 240 and the image sensor 252 due to the contraction and expansion of the housing 200, the lens holder 220, and the coupling members 260 and 270 at high or low temperatures is compensated through the contraction and expansion of the lens module 240, it is possible to minimize the change in the distance between the image sensor 252 and the lens module 240 due to temperature change, and the resolution of the camera module may be stabilized.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera module comprising:
a housing;
a lens holder disposed inside the housing;
a lens module disposed inside the lens holder; and
a printed circuit board disposed at a lower portion of the housing and including an image sensor facing the lens module,
wherein a region of the lens module is screw-coupled to an inner surface of the lens holder,
wherein the lens holder is screw-coupled to an inner surface of the housing,
wherein the screw-coupled region of the lens module is disposed more adjacent to an upper end of the lens module than a lower end thereof;
wherein the housing includes a body part in a shape of a cylinder and a protruded part protruded downward from a lower surface of the body part,
wherein a coupling member is disposed between the protruded part and the printed circuit board,
wherein, when the housing or the coupling member expands, the upper end of the lens module is configured to remain fixed with the lens holder at the screw-coupled region, and a lower end of the lens module is configured to expand to come closer to the printed circuit board, and
wherein, when the housing or the coupling member is contracted, the upper end of the lens module is configured to remain fixed with the lens holder at the screw-coupled region, and the lower end of the lens module is configured to contract away from the printed circuit board.

2. The camera module according to claim 1, wherein the housing includes a first space section in which the lens holder is disposed and a second space section disposed at an inner side of the protruded part, and
wherein a lower end of the lens module is disposed in the second space section.

3. The camera module according to claim 2, wherein an inner surface of the housing to which the lens holder and the housing are screw-coupled is the first space section.

4. The camera module according to claim 1, wherein the lens holder includes a third space section whose upper and lower surfaces are open and the lens module is coupled thereto,
wherein a coupling part to which the lens module is screw-coupled is disposed on an inner surface of the third space section, and
wherein the coupling part is disposed adjacent to an upper end of the lens holder.

5. The camera module according to claim 1, wherein a material of the housing and the lens holder is plastic.

6. The camera module according to claim 1, wherein a length of the screw-coupled region between the lens module and the lens holder in an optical axis direction is equal to or less than 1/2 of a length of the lens module.

7. The camera module according to claim 1, wherein the coupling member includes epoxy.

8. The camera module according to claim 1, wherein the lens holder includes a first coupling portion screwed to the housing, and
wherein the first coupling portion has a shape in which a portion of a side surface of the lens holder protrudes outward relative to other areas.

9. The camera module according to claim 1, wherein the lens module includes a third coupling portion screwed to the lens holder, and
wherein the third coupling portion has a shape in which a portion of the a side surface of the lens module protrudes outward relative to other areas.

10. A camera module comprising:
a housing;
a lens holder disposed on an upper portion of the housing;
a lens module disposed at an inner side of the housing and the lens holder; and
a printed circuit board being disposed at a lower portion of the housing and including an image sensor facing the lens module,
wherein a region of the lens module is screw-coupled to an inner surface of the lens holder,
wherein the screw-coupled region of the lens module is disposed more adjacent to an upper end of the lens module than a lower end thereof,
wherein a second coupling member is disposed between the housing and the lens holder,
wherein the second coupling includes an epoxy,
wherein the housing includes a second protruded part protruded upward from an upper surface,
wherein a third protruded part being protruded outward from other regions is disposed at a lower portion of the lens holder, and
wherein the second coupling member is disposed between the second protruded part and the third protruded part.

11. The camera module according to claim 10, wherein the housing includes a body part in the shape of a cylinder and a first protruded part being protruded downward from a lower surface of the body part, and
wherein a first coupling member is disposed between the first protruded part and the printed circuit board.

12. The camera module according to claim 11, wherein the first coupling member includes epoxy.

13. The camera module according to claim 11, wherein a first space is formed inside the body part,
wherein a second space communicating with the first space is formed inside the first protruded part, and wherein a cross-sectional area of the second space is larger than that of the first space.

14. The camera module according to claim 10, wherein a length of the screw-coupled region of the lens module and the lens holder with respect to an optical axis direction is one half or less of the length of the lens module.

15. The camera module according to claim 10, wherein an outer surface of the third protruded part is disposed inner than an outer surface of the second protruded part.

16. A camera module comprising:

a housing;

a lens holder disposed on an upper portion of the housing;

a lens module disposed at an inner side of the housing and the lens holder; and a printed circuit board being disposed at a lower portion of the housing and including an image sensor facing the lens module, wherein a region of the lens module is screw-coupled to an inner surface of the lens holder, wherein the screw-coupled region of the lens module is disposed more adjacent to an upper end of the lens module than a lower end thereof, wherein the lens module includes a second coupling portion screwed to the lens holder, and wherein the second coupling portion has a shape in which a portion of a side surface of the lens module protrudes outward relative to other areas.

17. A camera module comprising:

a housing;

a lens holder disposed on an upper portion of the housing;

a lens module disposed at an inner side of the housing and the lens holder; and a printed circuit board being disposed at a lower portion of the housing and including an image sensor facing the lens module, wherein a region of the lens module is screw-coupled to an inner surface of the lens holder, wherein the screw-coupled region of the lens module is disposed more adjacent to an upper end of the lens module than a lower end thereof, wherein the housing includes a body part in the shape of a cylinder and a first protruded part being protruded downward from a lower surface of the body part, wherein a first coupling member is disposed between the first protruded part and the printed circuit board, and wherein a side surface of the first protruded part forms the same plane as a side surface of the printed circuit board.

\* \* \* \* \*